Nov. 13, 1962    J. C. BECK    3,063,341

ZOOM LENS

Filed Sept. 12, 1961

INVENTOR.
JAMES C. BECK
BY
R. E. Grangu
ATTORNEY

United States Patent Office 3,063,341
Patented Nov. 13, 1962

3,063,341
ZOOM LENS
James C. Beck, Northridge, Calif., assignor, by mesne assignments, to Encino Engineering, Encino, Calif., a partnership
Filed Sept. 12, 1961, Ser. No. 137,548
3 Claims. (Cl. 88—57)

This invention relates to a zoom lens and more particularly to a novel and improved variable focal length lens system of the optically compensated type.

A zoom lens system is one in which two or more parts are moved with respect to each other to obtain a continuously variable focal length, and hence magnification, while the image is kept in the same image plane. Continuously variable focal length lenses are generally classified as either mechanically compensated or optically compensated. In certain of these lens systems, the diaphragm is opened at the same time so that its linear aperture increases with the focal length, making it possible to keep the relative aperture of the whole system constant while the focal length varies.

The design objective of a zoom lens system is to minimize image errors arising from the shifting of the movable components. In an ideal system, the image errors are small, at least for the beginning and end positions of the zooming procedure, and do not become too large for intermediate positions. Mechanically compensated zoom lens are complicated by the fact that the components must move at different rates and therefore require a relatively complex cam or gear mechanism to link them to the single control movement. Conventional optically compensated zoom lens systems do not require different rates of motion of the various moving components. Optically compensated types of zoom lens systems of the prior art are further characterized by the fact that they have a very large number of elements comprising a large number of complex components; typically, between 13 and 22 elements have been used. In lenses of small linear aperture, such as commonly used with the 8-mm. motion picture cameras, the number of components can be reduced somewhat. Successful 35-mm. zoom lens systems, of the optically compensated type, have heretofore employed 13 or more elements.

In motion picture photography, a certain loss of definition in a zoom lens can be tolerated, since its effect may be merely to smooth over the discontinuity between one film frame and the next. However, this degradation of the image cannot be tolerated in 35-mm. still photography.

By the present invention, there is provided an optically compensated zoom lens system, suitable for high quality 35-mm. still photography, which employs only four components, comprising seven elements. In the present invention, the first and third components are coupled together and moved at the same rate, while the others remain fixed. The small focus shift characteristic of most optical zooms is minimized sufficiently by giving the front, true zoom part of the lens, a much longer focal length than is required; the fixed rear part is then designed to reduce this focal length and, in so doing, reduce the effect of focus shift. The system of the present invention can be in exact focus at three points, and the deviation elsewhere along the focal length range can be maintained within design tolerances.

The lens system of the invention is readily adaptable to modification by directly scaling-up or scaling-down the system dimensions to provide different ranges of focal lengths. For example, all physical dimensions of a lens system designed to have a range of focal lengths from 95 to 205 millimeters, at $f/6.3$, may be doubled to provide a system having a range of focal lengths from 190 to 410 millimeters, at $f/6.3$.

It is therefore a principal object of the invention to provide novel and improved continuously variable focal length lens system, of the optically compensated type, having simplified construction and improved image definition.

It is another object of the invention to provide a zoom lens having two movable components and two fixed components; the use of the second one of the fixed components being optional.

Yet another object of the invention is to provide a zoom lens having a focal length range which is continuously variable from 95 to 205 millimeters, has an $f$-number of 6.3, and is suitable for use in 35-millimeter still photography.

Yet another object of the invention is to provide a novel and improved zoom lens system which overcomes disadvantages of previous zoom lens systems and optical imaging methods heretofore intended to accomplish generally similar purposes.

Many other advantages, features and additional object of the present invention will become manifest to those versed in the art upon making reference to the detailed description and the accompanying set of drawings in which a preferred structural embodiment incorporating the principles of the present invention is shown by way of illustrative example.

Figure 1:
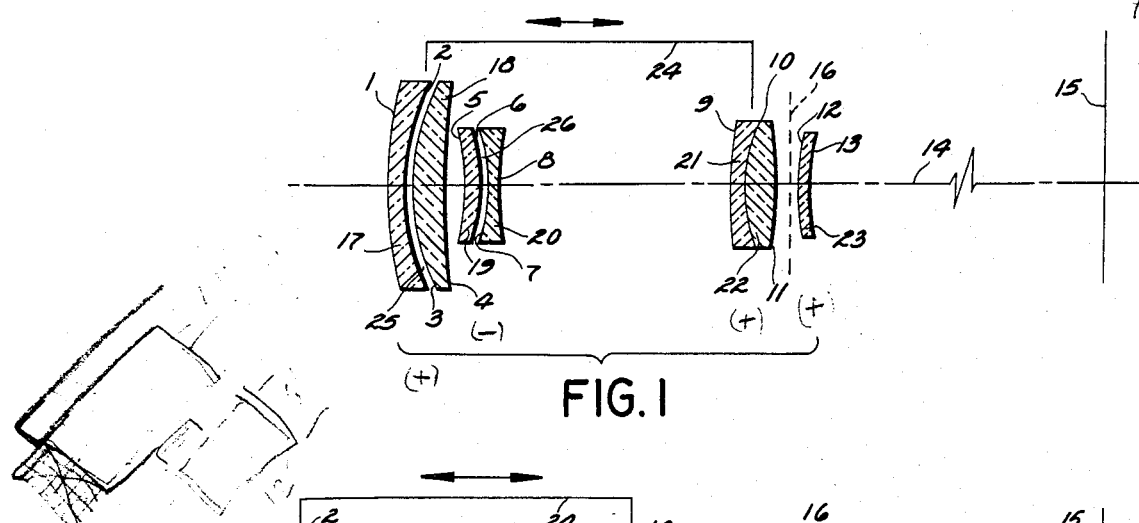
FIGURE 1 is a schematic diagram of a preferred embodiment of a zoom lens system according to the invention, showing the moving components at their rearwardmost position for providing the minimum focal length.

Looking now at FIGURE 1, a preferred embodiment of the lens system according to the invention comprises four optical components and, if desired, an iris diaphragm. All of the optical components are coaxially arranged along a common optical axis 14. The image plane is identified by reference numeral 15. The first component, located at the front of the lens system, comprises an air-spaced doublet. This first component is movable. The front and rear surfaces of the first element of the front component are identified by the reference numerals 1 and 2, respectively. The front and rear surfaces of the second element of the front component are identified by the reference numerals 3 and 4, respectively, The second component is a fixed negative component comprising an air-spaced doublet. The front and rear surfaces of the first element in the second component are identified as 5 and 6, respectively. The second element of the second component is biconcave and has its first and second surfaces identified as 7 and 8, respectively.

The third component is movable and comprises a cemented doublet consisting of a negative meniscus element cemented to a biconvex element. The first surface is identified by reference numeral 9; the cemented surface is identified by reference numeral 10 and the rear surface is identified by numeral 11. This component is mechanically coupled with the first component for direct movement therewith.

The fourth component comprises a fixed positive meniscus lens, the first surface of which is identified as 12 and the rear surface of which is 13.

An iris diaphragm 16 may be located at the nodal point just ahead or behind the rear (fourth) component. Preferably, the diaphragm should have a clear aperture of 0.8 inch at $f/6.3$. An advantage of placing the diaphragm 16 between the third and fourth components is that, in a practical construction, it would be enclosed within the lens tube or lens system housing and would thus be protected from damage.

The first and third components are mechanically coupled together and may be movable backward and forward, relative to the second and fourth components, which are fixed in order to vary the focal length. The movement of the movable components may be controlled by any suitable mechanical means such as a crank, lever, knob, etc., as will be obvious to those skilled in the art. Exact details of the shifting mechanism have been omitted inasmuch as the function is so well known that it is deemed unnecessary to show any one particular structure.

The system has three points of exact optical compensation; at intermediate positions, between exact compensation, the image error is maintained within design tolerances.

The seven lens elements comprising the system are identified from front to rear, by the reference numerals 17 through 23. The index of refraction ($N_d$), for the D line of the spectrum, and the dispersion index (V) for the optical material comprising each lens element of the system is indicated in the following table:

| Lens Element | $N_d$ | V |
| --- | --- | --- |
| 17 | 1.63980 | 34.6 |
| 18 | 1.60729 | 59.5 |
| 19 | 1.71736 | 29.5 |
| 20 | 1.51633 | 64.0 |
| 21 | 1.63980 | 34.6 |
| 22 | 1.60729 | 59.5 |
| 23 | 1.60729 | 59.5 |

The radius, clear aperture and diameter of each lens element comprising the system is indicated in inches in the following table:

| Surface Number | Radius | Clear Aperture | Diameter |
| --- | --- | --- | --- |
| 1 | 3.075 | 1.50 | 1.56 |
| 2 | 1.893 | 1.50 | 1.56 |
| 3 | 1.893 | 1.50 | 1.56 |
| 4 | 8.494 | 1.50 | 1.56 |
| 5 | 1.667 | 0.84 | 0.90 |
| 6 | 1.128 | 0.84 | 0.90 |
| 7 | 1.138 | 0.84 | 0.90 |
| 8 | 3.863 | 0.84 | 0.90 |
| 9 | 4.847 | 0.89 | 0.95 |
| 10 | 1.128 | 0.89 | 0.95 |
| 11 | 2.915 | 0.89 | 0.95 |
| 12 | 2.681 | 0.80 | 0.86 |
| 13 | 3.333 | 0.80 | 0.86 |

Figure 2:
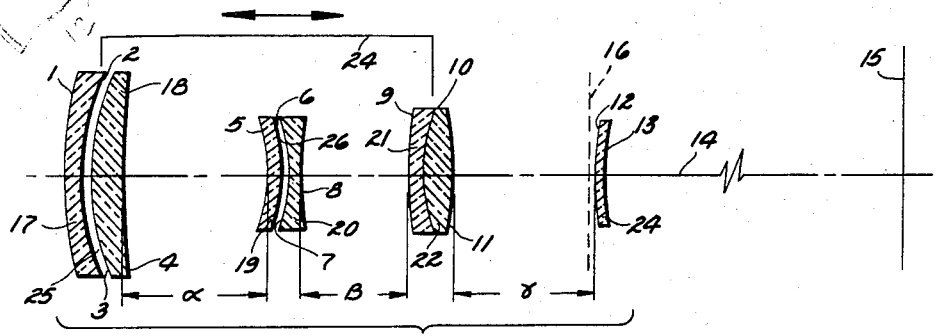
FIGURE 2 illustrates the lens system of FIGURE 1 with the movable components at their intermediate position for providing an intermediate focal length.
Figure 3:
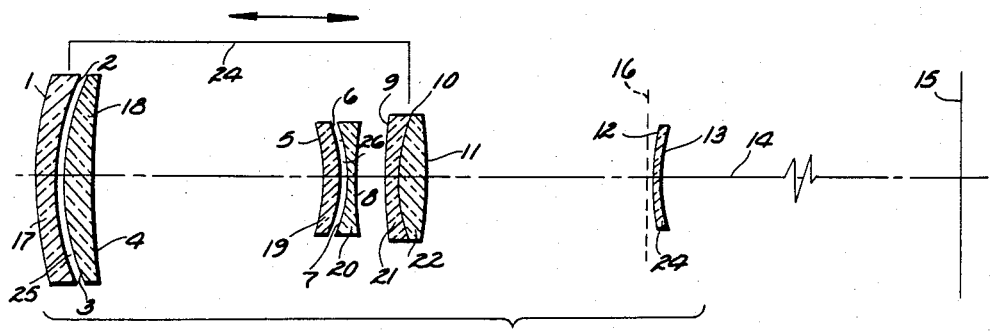
FIGURE 3 illustrates the lens system of FIGURES 1 and 2 with the movable components at their most forward position for providing the maximum focal length.

FIGURES 1, 2, and 3 illustrate the relative positions of the movable components for wide-angle, normal, and telephoto settings, respectively. The movable components move at the same rate and are directly linked by a suitable mechanical link 24. The variable spaces between the movable and fixed lens components for each of these three settings, resulting in effective focal lengths of 95 millimeters, 150 millimeters, and 205 millimeters, respectively, are provided in the following table; $\alpha$ equals the variable space between the front movable component (17, 18) and the second fixed component (19, 20), $\beta$ equals the variable space between the second fixed component (19, 20) and the movable third component (21, 22), and $\gamma$ equals the variable space between the movable third component (21, 22) and the fixed rear component (23). Alpha, beta, and gamma are in terms of inches.

| Focal Length | $\alpha$ | $\beta$ | $\gamma$ |
| --- | --- | --- | --- |
| 205-mm | 1.750 | 0.186 | 1.744 |
| 150-mm | 1.110 | 0.826 | 1.104 |
| 95-mm | 0.150 | 1.786 | 0.144 |

The sum of $\alpha$ and $\beta$ is a constant, and in the example tabulated hereinabove, $\alpha + \beta = 1.936$.

The axial thickness of the lens elements, as indicated by "$d$," and the axial air spaces between the lens elements, as indicated by "$l$," are tabulated hereinbelow in terms of inches:

| Lens Element | $d$ |
| --- | --- |
| 17 | 0.150 |
| 18 | 0.250 |
| 19 | 0.144 |
| 20 | 0.095 |
| 21 | 0.100 |
| 22 | 0.246 |
| 23 | 0.100 |

| Air-space | $l$ |
| --- | --- |
| 25 | 0.060 |
| 26 | 0.030 |

The system defined by the above-tabulated numerical construction data will focus the image approximately 4.92 inches beyond the rearmost element 23.

The lens system may be scaled upward or downward by geometrically changing the physical dimensions of the system to provide the specifications desired for a given application. That is, the distances between elements, the diameters of the elements, and the radii of the surfaces of the lens elements may be increased or decreased by a given factor, with a proportional increase or decrease in the focal length. This symmetry of the system permits its adaptation to a given set of requirements.

The numerical construction data contained hereinabove is included only by way of example. It should be understood that modification of the lens system is contemplated, within the intended scope of the invention, to provide specifications dictated by the various uses to which the lens may be put, and such modification may readily be made by those skilled in the art. For example, the fourth component 23 is not part of the couplet modifier and thus may be deleted with a resultant increase of approximately 25 percent in the system's focal length. Final adjustment in the focal length of the system may readily be made by suitably varying the parameters of the rearmost stationary component 23. Deleting the fourth component 23 will increase the focal length and $f$-number without substantially changing the other characteristics of the system. Furthermore, diaphragm 16 may be deleted at the option of the user.

The disclosure of the invention as set forth hereinabove is intended to explain the fundamental optical arrangement of the lens system apart from details of housings, mounting fixtures, or other supporting features since it is considered that the description of the invention is sufficient to enable those skilled in the art to practice it.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore it is intended that the invention be limited only as indicated by the scope of the following claims.

What is claimed is:

1. A variable magnification zoom optical system of the optically compensated type for use as a photographic objective having a relative aperture as great as $f/6.3$, said system comprising a movable air-spaced doublet lens which is convex toward the front, a stationary negative air-spaced doublet lens, and a movable cemented doublet lens, all being optically aligned in the order named, said movable lenses being connected together for like movements with respect to the stationary lenses whereby an image of continuously variable size is formed thereby which remains substantially axially stationary throughout a range of magnifications, the numerical construction data for said system being defined by the following table:

| Lens elements | Radii | Thickness | $N_d$ | V |
|---|---|---|---|---|
| 1 | $r_1 = +3.075$ | $d_1 = 0.150$ | 1.63980 | 34.6 |
|   | $r_2 = +1.893$ | $l_1 = 0.060$ | | |
| 2 | $r_3 = +1.893$ | $d_2 = 0.250$ | 1.60729 | 59.5 |
|   | $r_4 = +8.494$ | $0.150 \leq l_2 \leq 1.750$ | | |
| 3 | $r_5 = -1.667$ | $d_3 = 0.144$ | 1.71736 | 29.5 |
|   | $r_6 = -1.128$ | $l_3 = 0.030$ | | |
| 4 | $r_7 = -1.138$ | $d_4 = 0.095$ | 1.51633 | 64.0 |
|   | $r_8 = +3.863$ | $0.186 \leq l_4 \leq 1.786$ | | |
| 5 | $r_9 = +4.847$ | $d_5 = 0.100$ | 1.63980 | 34.6 |
|   | $r_{10} = +1.128$ | | | |
| 6 | $r_{11} = +1.128$ | $d_6 = 0.246$ | 1.60729 | 59.5 |
|   | $r_{12} = -2.915$ | | | | wherein the first column lists six lens elements in numerals in order from front to rear; wherein $N_d$ is the index of refraction for the $d$ line of the spectrum, V is the dispersive index, and $r$, $d$ and $l$ refer, respectively, to the radii of curvature of the refractive surfaces, the axial thickness of the lens elements, and the axial air spaces between the lens elements, the subscripts on the characters $r$, $d$, and $l$ being numbered consecutively from front to rear, and the plus and minus signs in the second column corresponding to refracting surfaces which are respectively convex and concave to the front.

2. A zoom optical system as defined in claim 1 having a rearmost stationary positive meniscus lens for downwardly adjusting the focal length limits of the system, the numerical construction data for said rearmost stationary lens being defined by the following table which is an extension of, and employs the same notation as, the table of claim 1:

| Lens element | Radii | Thickness | $N_d$ | V |
|---|---|---|---|---|
| 7 | $r_{12} = +2.681$ | $0.144 \leq l_5 \leq 1.744$ | 1.60729 | 59.5 |
|   | $r_{13} = +3.333$ | $d_7 = 0.100$ | | |

3. A zoom lens system comprising a movable positive air-spaced doublet front lens, a fixed negative air-spaced doublet intermediate lens, a movable positive cemented intermediate lens directly linked with said front lens, a diaphragm having a clear aperture of 0.8 inch at $f/6.3$, and a fixed positive meniscus rear lens, and further characterized by the system being in substantial compliance with the following table wherein dimensions are in terms of inches and beginning with the front of the system $L_1$ to $L_7$ designate the lens elements, $r_1$ to $r_{13}$ the radii of curvature of the surfaces, $T_1$ to $T_7$ the axial thickness, $S_1$ to $S_5$ the axial separations, $A_1$ to $A_7$ the clear aperture, $N_d$ the indices of refraction for the $d$ line of the spectrum, and V the dispersion numbers:

| | Radii | Thickness | Aperture | $N_d$ | V |
|---|---|---|---|---|---|
| $L_1$ | $r_1 = +3.075$ | $T_1 = 0.150$ | $A_1 = 1.50$ | $N_d = 1.63980$ | $V = 34.6$ |
|   | $r_2 = -1.893$ | $S_1 = 0.60$ | | | |
| $L_2$ | $r_3 = +1.893$ | $T_2 = 0.250$ | $A_2 = 1.50$ | $N_d = 1.60729$ | $V = 59.5$ |
|   | $r_4 = +8.494$ | $0.150 \leq S_2 \leq 1.750$ | | | |
| $L_3$ | $r_5 = -1.667$ | $T_3 = 0.144$ | $A_3 = 0.84$ | $N_d = 1.71736$ | $V = 29.5$ |
|   | $r_6 = -1.128$ | $S_3 = 0.030$ | | | |
| $L_4$ | $r_7 = -1.138$ | $T_4 = 0.095$ | $A_4 = 0.84$ | $N_d = 1.51633$ | $V = 64.0$ |
|   | $r_8 = +3.863$ | $0.186 \leq S_4 \leq 1.786$ | | | |
| $L_5$ | $r_9 = +4.847$ | $T_5 = 0.100$ | $A_5 = 0.89$ | $N_d = 1.63980$ | $V = 34.6$ |
|   | $r_{10} = +1.128$ | | | | |
| $L_6$ | $r_{11} = +1.128$ | $T_6 = 0.246$ | $A_6 = 0.89$ | $N_d = 1.60729$ | $V = 59.5$ |
|   | $r_{12} = -2.915$ | $0.144 \leq S_5 \leq 1.744$ | | | |
| $L_7$ | $r_{13} = +2.681$ | $T_7 = 0.100$ | $A_7 = 0.80$ | $N_d = 1.60729$ | $V = 59.5$ |
|   | $r_{14} = +3.333$ | | | | |

References Cited in the file of this patent

UNITED STATES PATENTS 3,030,863  Schwartz et al. _____ Apr. 24, 1962

FOREIGN PATENTS 597,354  Germany _____ May 25, 1934